DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 713

T869,011

EMULSIFIABLE POLYETHYLENE COMPOSITIONS PREPARED FROM LOW MOLECULAR WEIGHT POLYETHYLENE AND UNSATURATED POLYCARBOXYLIC COMPOUNDS

Marion O. Brunson, % Tennessee Eastman Co., Kingsport, Tenn.

Continuation of application Ser. No. 519,444, Jan. 10, 1966. This application May 26, 1969, Ser. No. 828,807

Int. Cl. C08f *27/28, 27/00*

U.S. Cl. 260—78.4

No Drawing. 15 Pages Specification

Emulsifiable low molecular weight modified polyethylene compositions and processes for their preparation. The modified polyethylenes are prepared by thermally degrading high molecular weight crystallizable polyethylene having a melt index of 0.1 to about 200 or greater at a temperature of 290–425° C. to prepare a low molecular weight crystallizable polyethylene material having an inherent viscosity of .1 to about .5 and reacting the thermally degraded material with an unsaturated polycarboxylic acid, anhydride or ester thereof, at a temperature of about 200° C. to 400° C. in the absence of oxygen to prepare an emulsifiable modified polyethylene having a melt viscosity of 250–15,000 centipoise at 150° C. and a saponification number of at least 10, preferably 12–25. Alternatively, low viscosity polyethylene having an inherent viscosity of .1 to about .5 is reacted with an unsaturated polycarboxylic compound to provide an emulsifiable modified polyethylene having a melt viscosity of 250–15,000 centipoise at 150° C. and a saponification number of at least 10 and preferably 12–25.

The modified low molecular weight polyethylene compositions are useful for many purposes including laminating aluminum foil to kraft paper, hot melt adhesives such as for use in sealing cartons for packaging frozen foods, as modifiers to improve the adhesion properties of petroleum waxes, and as aqueous emulsions for use as textile-treating agents or as floor polishes.